UNITED STATES PATENT OFFICE.

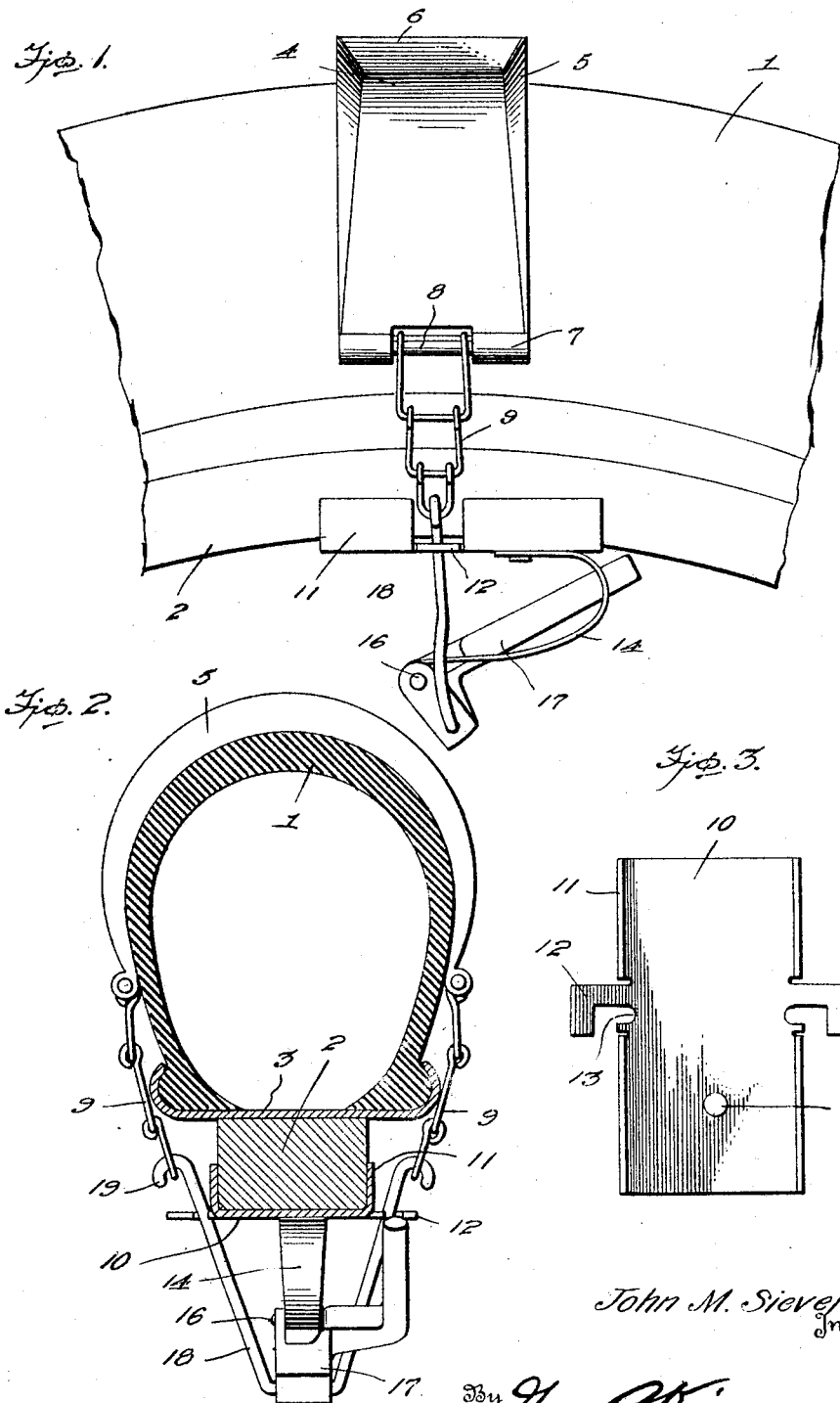

JOHN M. SIEVERT, OF SHERMAN, SOUTH DAKOTA.

ANTISKID ATTACHMENT FOR WHEELS.

1,358,590.   Specification of Letters Patent.   Patented Nov. 9, 1920.

Application filed January 13, 1917. Serial No. 142,211.

*To all whom it may concern:*

Be it known that I, JOHN M. SIEVERT, a citizen of the United States, and resident of Sherman, in the county of Minnehaha and State of South Dakota, have invented certain new and useful Improvements in Antiskid Attachments for Wheels, of which the following is a specification.

This invention relates to improvements in anti-skid attachments for wheels, and has for its object the provision of an anti-skidding attachment, which, when engaged with a wheel, will prevent skidding or slipping of the same transversely or longitudinally of a slippery or unsolid roadway.

As an object of equal importance, the invention aims to provide a novel means for securely attaching the anti-skid device over the thread portion of a wheel or tire in but a minimum amount of time and in such a manner to prevent undue movement of the same, the device being capable of removal or disengagement from the said portion of the wheel or tire with equal ease and despatch.

It is also an object of my invention to provide an anti-skid attachment that can be secured to the tread portions of wheels varying in size.

Among other aims and objects of the invention may be recited, the provision of an attachment of the character mentioned, with a view to compactness, and in which the number of parts are few, the construction simple, and the cost of production small.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

In the drawings:

Figure 1 is a side elevation of my improved anti-skid attachment as applied to a fragment of a vehicle wheel;

Fig. 2 is a transverse section on the line 2—2 of Fig. 1 looking in the direction of the arrow, to show the arrangement of the attachment over the tread portion of the tire; and Fig. 3 is a detail in plan of the felly engaging the member.

Referring more specifically to the drawings, wherein like reference characters designate correspondnig parts in the several views, I have shown for the purposes of illustration the improved anti-skid attachment as being applied over the tread portion of a pneumatic tire, indicated by the numeral 1, which tire is mounted upon the felly 2 of a vehicle wheel and secured thereto through the medium of a clencher rim 3. An anti-skid plate, comprising a curved strip 4, is fitted over the tread portion of the pneumatic tire 1 and has formed upon the opposite sides thereof, upturned flanges 5, the said flanges serving as means for preventing slipping of the vehicle wheel longitudinally of the road way or the like, while a rib 6 is also formed integral with the outer face of the strip 4, intermediate the upstanding flanges 5, and affords means for preventing slipping or skidding of the vehicle wheel transversely of the road way or the like. The opposite ends of the strip 4 are bifurcated and rolled upon themselves as indicated by the numeral 7 and receive therethrough pivot pins 8, whereby chains 9 may be engaged with the same, the said chains serving as means for receiving the improved device for securing the anti-skid plate to the vehicle wheel or tire.

In order to provide means for securing the anti-skid plates 4 to the wheels or more specifically, over the tread portions thereof, there is provided a substantially rectangular plate 10, the side portions of which are bent outwardly to provide a plurality of right-angularly disposed flanges 11 adapted to embrace the side portions of the wheel felly 2. Portions of the said flanges 11 are formed to provide for laterally extending guide elements 12, the said guide elements being approximately L-shaped and having recessed portions or pockets formed in the body of the plate 10 adjacent their jointure with the same, which pockets are designated by the numeral 13. It is evident, that the plates 10 by the provision of the flanges 11 will be permitted to fit snugly over the inner face of the wheel felly 2, thereby preventing undue lateral movement of the same with relation thereto.

A curved spring supporting arm 14 is secured to the body portion of the rim engaging plate 10 by means of a rivet 15 and has the free extremity thereof rolled upon itself whereby to receive a pivot pin 16 therethrough, the said pivot pin also serving as means for pivotally supporting a lever tightener 17.

A substantially V-shaped element 18 is passed through the offset portion of the lever tightener 17 and has its outer extremities hooked as at 19, thereby, providing a plurality of connecting arms. As will be noted, the outer portions of the said connecting arms are passed through the recesses or pockets 13 formed in the body portion of the rim engaging plates adjacent the guide members 12. Hence, the same will be properly guided in their vertical movement to permit proper functioning thereof.

In operation, the anti-skid plate 4 is placed over the tread portion of the tire or wheel whereupon the felly engaging plate 10 is then placed over the inner face of the wheel rim 2 and the hooked extremities 19 of the connecting arms are engaged with the proper links of the chain 9. With the connecting arms engaged, the lever tightener 17 is now swung upon the pivot pin 16 to locked position, as shown in Fig. 1, consequently, causing the connecting arms to be pulled inwardly and the anti-skid plate 4 to be securely fitted over the tread portion of the tire 1. By providing the curved spring arm 14 for supporting the lever tightener 17, it is to be appreciated, that undue depression of the pneumatic tire will be prevented, since, the lever tightener by reason of its spring mounting will permit the anti-skid plate to adjust itself with respect to the said tire. Furthermore, the anti-skid plate will be yieldably maintained in engagement with the tread portion of the tire, and thus, liability of slipping or other undue movement of the same will be materially lessened. The guiding element 12 will prevent lateral movement of the connecting arm, consequently, allowing the lever tightener 17 to properly draw the same into clamping or locked position. The attachment may be readily removed from the tire or vehicle wheel by merely swinging the lever tightener to its releasing or reverse position, whereupon, outward movement of the connecting arms will be permitted and the engaged links of the chain 9 may be readily freed. Should the anti-skid attachment be used upon tires or vehicle wheels of varying size, the hooked portions 19 of the connecting arms may be engaged with any of the links of the chains 9, such as conditions or preference may dictate.

I claim:

An anti-skid attachment including an anti-skid member to span the tread portion of the tire, chains engaged with the opposite ends of said member, a truncated V-shaped connector for said chains having outturned terminal hooks for engagement with the links of the chain, a bell crank having its short arm pivoted at its free end to the apex of said truncated V-shaped element, a substantially U-shaped spring pivoted at one end to the lever at the junction of its arms, a bracket for engagement with the inner periphery of the rim of a wheel and having projecting laterally from the side edges thereof L-shaped ears to receive and support the arms of the V-shaped element, said spring having its other end fixedly secured to the bracket to bear on the bracket upon movement of the lever to release the V-shaped member from engagement with the chain.

In testimony whereof I affix my signature hereto.

JOHN M. SIEVERT.